(12) United States Patent
Fan et al.

(10) Patent No.: US 10,809,607 B2
(45) Date of Patent: Oct. 20, 2020

(54) ILLUMINAITON SYSTEM AND PROJECTION APPARATUS

(71) Applicant: Coretronic Corporation, Hsin-Chu (TW)

(72) Inventors: Chen-Wei Fan, Hsin-Chu (TW); Hao-Wei Chiu, Hsin-Chu (TW); De-Sheng Yang, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/551,728

(22) Filed: Aug. 27, 2019

(65) Prior Publication Data
US 2020/0159101 A1 May 21, 2020

(30) Foreign Application Priority Data

Nov. 15, 2018 (CN) .......................... 2018 1 1357470

(51) Int. Cl.
*G03B 21/14* (2006.01)
*G03B 21/20* (2006.01)
(Continued)

(52) U.S. Cl.
CPC ............ *G03B 21/2066* (2013.01); *F21V 9/40* (2018.02); *G03B 21/2033* (2013.01); *G03B 33/08* (2013.01)

(58) Field of Classification Search
CPC .. G03B 21/14; G03B 21/204; G03B 21/2066; G03B 21/2033; G03B 33/08; F21V 9/40; H04N 9/31
See application file for complete search history.

(56) References Cited

U.S. PATENT DOCUMENTS 9,897,899 B2 * 2/2018 Hu ........................ G03B 21/204
10,368,043 B2 * 7/2019 Chiu .................... H04N 9/3152
(Continued)

FOREIGN PATENT DOCUMENTS

CN 102707551 4/2015
CN 204593250 8/2015
(Continued)

OTHER PUBLICATIONS

"Search Report of Europe Counterpart Application", dated Feb. 20, 2020, p. 1-p. 7.

*Primary Examiner* — William C. Dowling
(74) *Attorney, Agent, or Firm* — JCIPRNET

(57) ABSTRACT

An illumination system including an excitation light source, a wavelength conversion module, a light splitting module and a light homogenizing element is provided. The light splitting module has a transfer region and a light splitting region, an excitation beam incident to the wavelength conversion module is converted into a wavelength converted beam by a wavelength conversion region, and is reflected by the reflection region, and the excitation beam coming from the wavelength conversion module is split into a first and a second sub-excitation beams by the light splitting region, and the first sub-excitation beam and the second sub-excitation beam form an excitation combination beam. The light homogenizing element uniforms the excitation combination beam and the wavelength converted beam, where an angle of the excitation combination beam incident to the light homogenizing element is 0.25 times larger than an angle of the wavelength converted beam incident to the light homogenizing element.

26 Claims, 13 Drawing Sheets

(51) Int. Cl.
*F21V 9/40* (2018.01)
*G03B 33/08* (2006.01)

(56) References Cited

U.S. PATENT DOCUMENTS

| | | |
|---|---|---|
| 2012/0242912 A1 | 9/2012 | Kitano |
| 2013/0250255 A1 | 9/2013 | Kurosaki et al. |
| 2013/0322056 A1 | 12/2013 | Konuma et al. |
| 2014/0071407 A1 | 3/2014 | Takahashi et al. |
| 2015/0153636 A1 | 6/2015 | Hartwig |
| 2015/0267880 A1 | 9/2015 | Hadrath et al. |
| 2015/0362830 A1 | 12/2015 | Liao et al. |
| 2016/0327851 A1* | 11/2016 | Liao .................. G03B 21/2066 |
| 2017/0059976 A1 | 3/2017 | Wang et al. |
| 2017/0205695 A1* | 7/2017 | Hu ...................... G03B 21/204 |
| 2017/0328540 A1 | 11/2017 | Paul et al. |
| 2018/0080626 A1* | 3/2018 | Hu ............................. F21V 9/45 |
| 2018/0284586 A1 | 10/2018 | Yang et al. |
| 2018/0299758 A1 | 10/2018 | Liao |
| 2020/0073219 A1* | 3/2020 | Chen .................. G03B 21/2033 |
| 2020/0103737 A1* | 4/2020 | Kawasumi ........... G02B 27/102 |

FOREIGN PATENT DOCUMENTS

| | | |
|---|---|---|
| CN | 103792768 | 9/2015 |
| CN | 105278226 | 1/2016 |
| CN | 206610072 | 11/2017 |
| JP | 2014075221 | 4/2014 |
| TW | I639035 | 10/2018 |
| WO | 2018166038 | 9/2018 |

\* cited by examiner

ILLUMINAITON SYSTEM AND PROJECTION APPARATUS

CROSS-REFERENCE TO RELATED APPLICATION

This application claims the priority benefit of China application serial no. 201811357470.8, filed on Nov. 15, 2018. The entirety of the above-mentioned patent application is hereby incorporated by reference herein and made a part of this specification.

BACKGROUND

Technical Field

The invention relates to an illumination system and a projection apparatus.

Description of Related Art

In recent years, projection apparatuses using solid state light sources such as Light-Emitting Diode (LED) and laser diodes, etc., have gradually taken a place in the market. Since the laser diode has light-emitting efficiency of higher than 20%, in order to breakthrough a light source limitation of the LED, a technique of using a laser light source to excite phosphor powder to produce a pure light source required by the projection apparatus is gradually developed.

Generally, the known projection apparatus includes optical elements such as an excitation light source (i.e. a blue light laser array), a phosphor wheel, a filter wheel, an integration rod, a light valve and a projection lens, etc., where after passing through the optical elements, an excitation beam provided by the excitation light source is outputted as a color light in timing through the phosphor wheel and the filter wheel, and after light uniforming and shaping operations of the integration rod, the light valve controls an image gray level, and then the projection lens projects an image. To be specific, when the excitation beam provided by the excitation light source is focused on a region of the phosphor wheel having phosphor powder, an excited beam is produced, and the excited beam is transmitted and focused in the integration rod. On the other hand, when the excitation beam irradiates a region of the phosphor wheel without the phosphor powder, the excitation beam penetrates through the phosphor wheel and is then focused in the integration rod. However, an angle of the excitation beam penetrating through the phosphor wheel incident to the integration rod is much less than an angle of the excited beam incident to the integration rod, which causes a poor color uniformity of a projected image. Moreover, a system optical path of the projection apparatus requires a design of an additional loop, which results in problems of high cost and uneasy to reduce a volume of the system structure.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an illumination system, which has a small volume.

The invention is directed to a projection apparatus, which has a small volume and good image quality.

Other objects and advantages of the invention may be further illustrated by the technical features broadly embodied and described as follows.

In order to achieve one or a portion of or all of the objects or other objects, an embodiment of the invention provides an illumination system adapted to provide an illumination beam, and the illumination system includes an excitation light source, a wavelength conversion module, a light splitting module and a light homogenizing element. The excitation light source is configured to emit an excitation beam. The wavelength conversion module is located on a transmission path of the excitation beam, and has at least one wavelength conversion region and a reflection region. The light splitting module is located on the transmission path of the excitation beam and located between the excitation light source and the wavelength conversion module, where the light splitting module has a transfer region and a light splitting region, and the excitation beam is incident to the wavelength conversion module through the transfer region, when the at least one wavelength conversion region of the wavelength conversion module is cut into the transmission path of the excitation beam, the excitation beam is converted into at least one wavelength converted beam by the at least one wavelength conversion region of the wavelength conversion module, and when the reflection region of the wavelength conversion module is cut into the transmission path of the excitation beam, the excitation beam is reflected by the reflection region of the wavelength conversion module, and the excitation beam coming from the reflection region of the wavelength conversion module is split into a first sub-excitation beam and a second sub-excitation beam by the light splitting region of the light splitting module, where the first sub-excitation beam and the second sub-excitation beam form an excitation combination beam. The light homogenizing element is located on a transmission path of the excitation combination beam and the at least one wavelength converted beam, and is configured to uniform the excitation combination beam and the at least one wavelength converted beam, where an angle of the excitation combination beam incident to the light homogenizing element is 0.25 times larger than an angle of the at least one wavelength converted beam incident to the light homogenizing element.

An embodiment of the invention provides a projection apparatus. The projection apparatus includes the aforementioned illumination system, a light valve and a projection lens. The light valve is located on the transmission path of the illumination beam, and is configured to convert the illumination beam into an image beam. The projection lens is located on a transmission path of the image beam, and is configured to convert the image beam into a projection beam.

Based on the above description, the embodiments of the invention include at least one of following advantages or effects. In the embodiments of the invention, through using the configuration of the transfer region and the light splitting region of the light splitting module, the projection apparatus and the illumination system are capable of causing that the angle of the excitation combination beam incident to the light homogenizing element is 0.25 times larger than the angle of the at least one wavelength converted beam incident to the light homogenizing element, which avails adjusting uniformity of the illumination beam formed by the excitation combination beam and the at least one wavelength converted beam, such that a projected image has good image quality.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
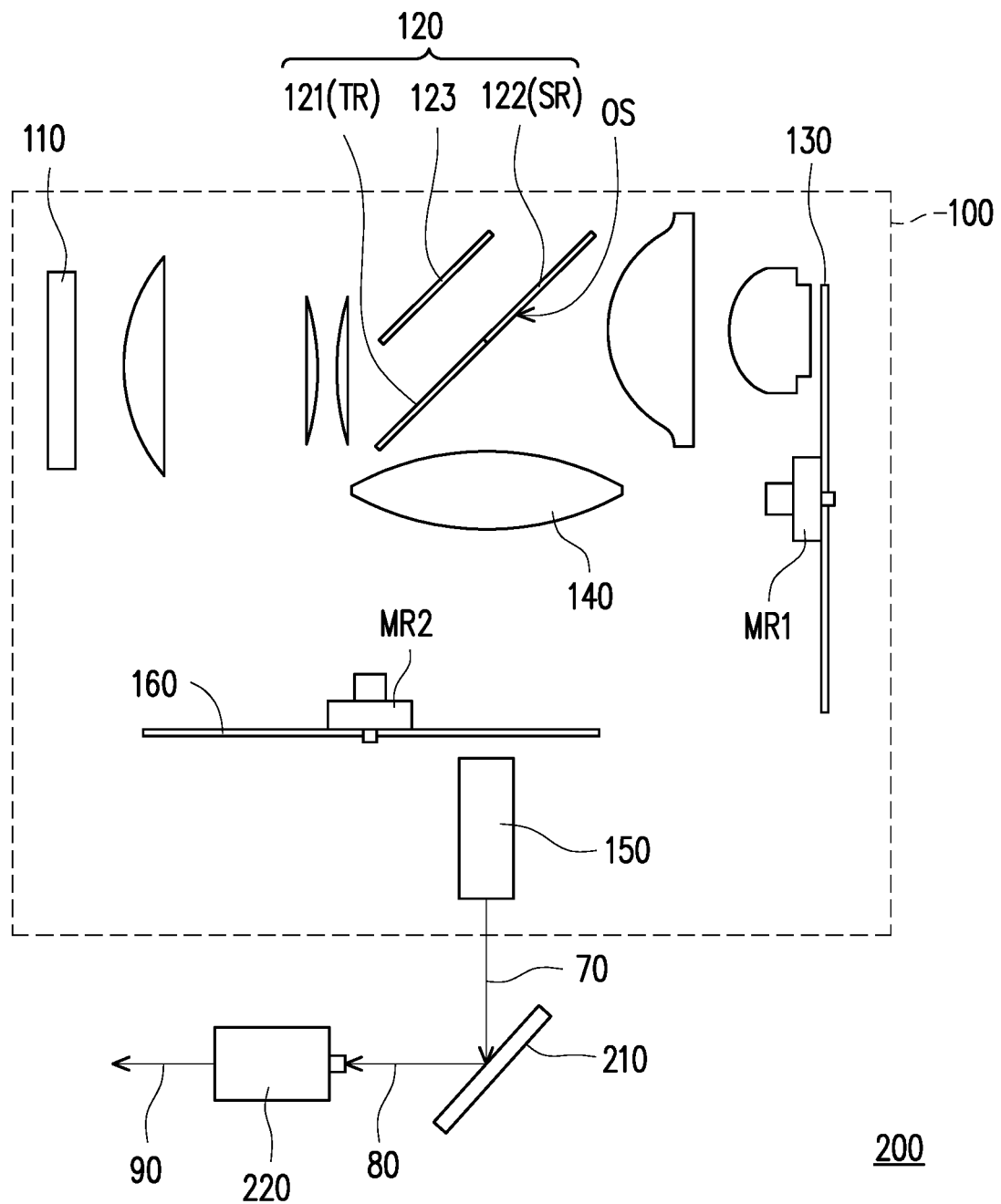
FIG. 1 is a structural schematic diagram of a projection apparatus according to an embodiment of the invention.
Figure 2A:
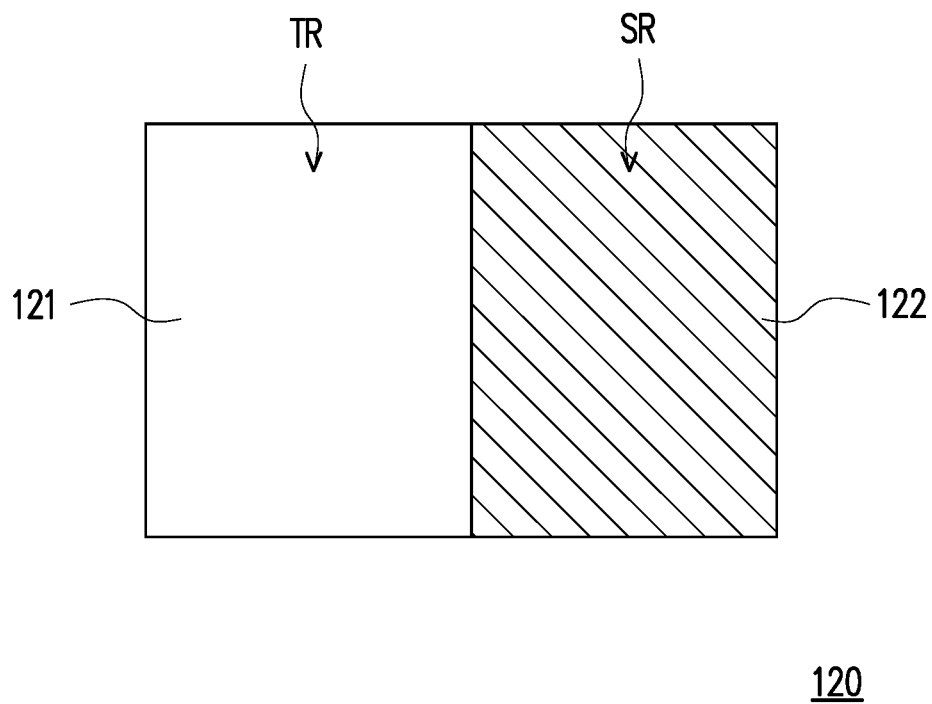
FIG. 2A is a schematic diagram of a transfer region and a light splitting region of a light splitting module of FIG. 1.
Figure 2B:
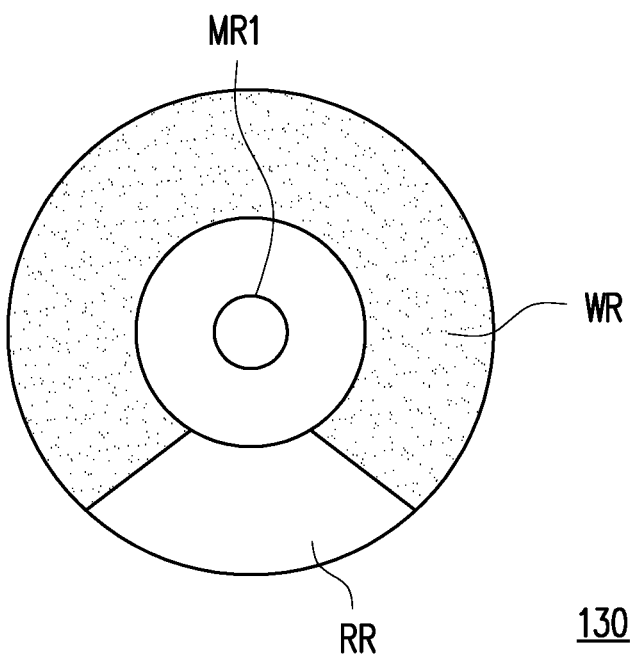
FIG. 2B is a front view of a wavelength conversion module of FIG. 1.
Figure 3A:
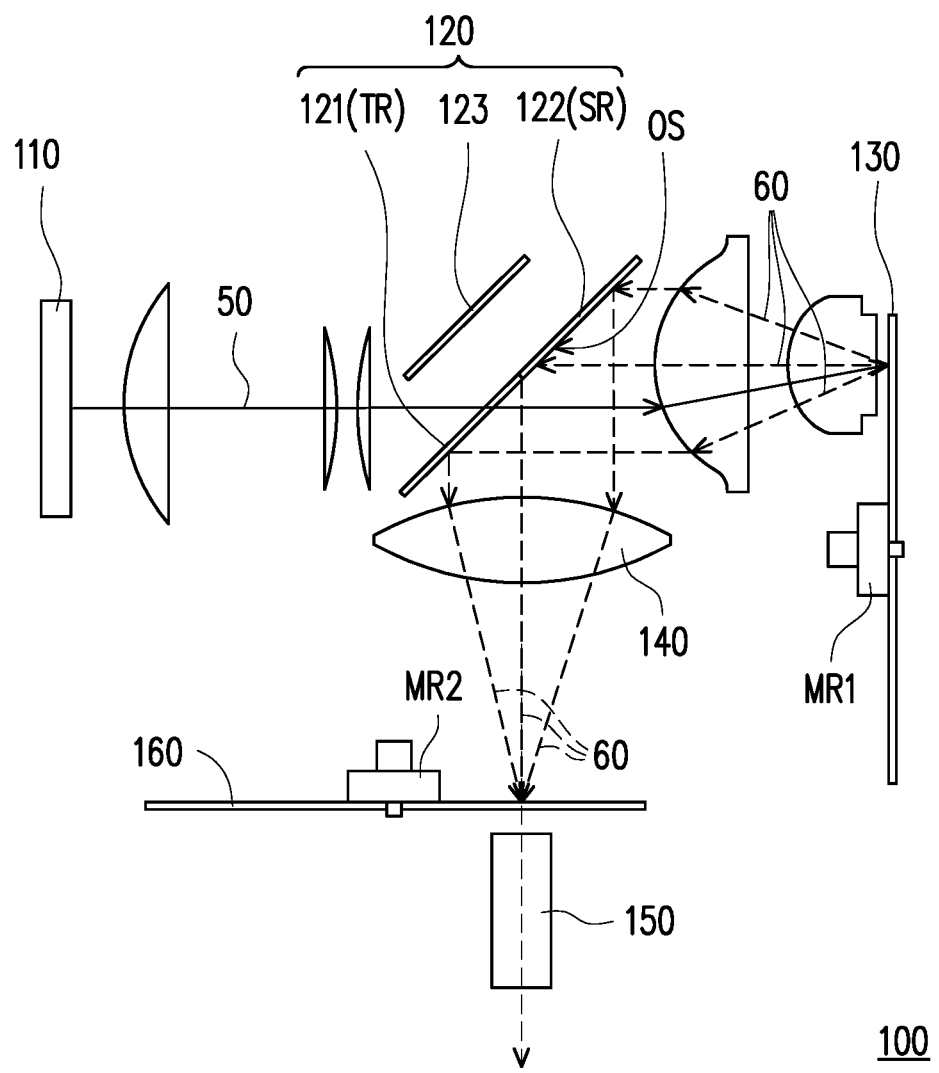
FIG. 3A is a schematic diagram of an optical path of a wavelength converted beam of an illumination system of FIG. 1.
Figure 3B:
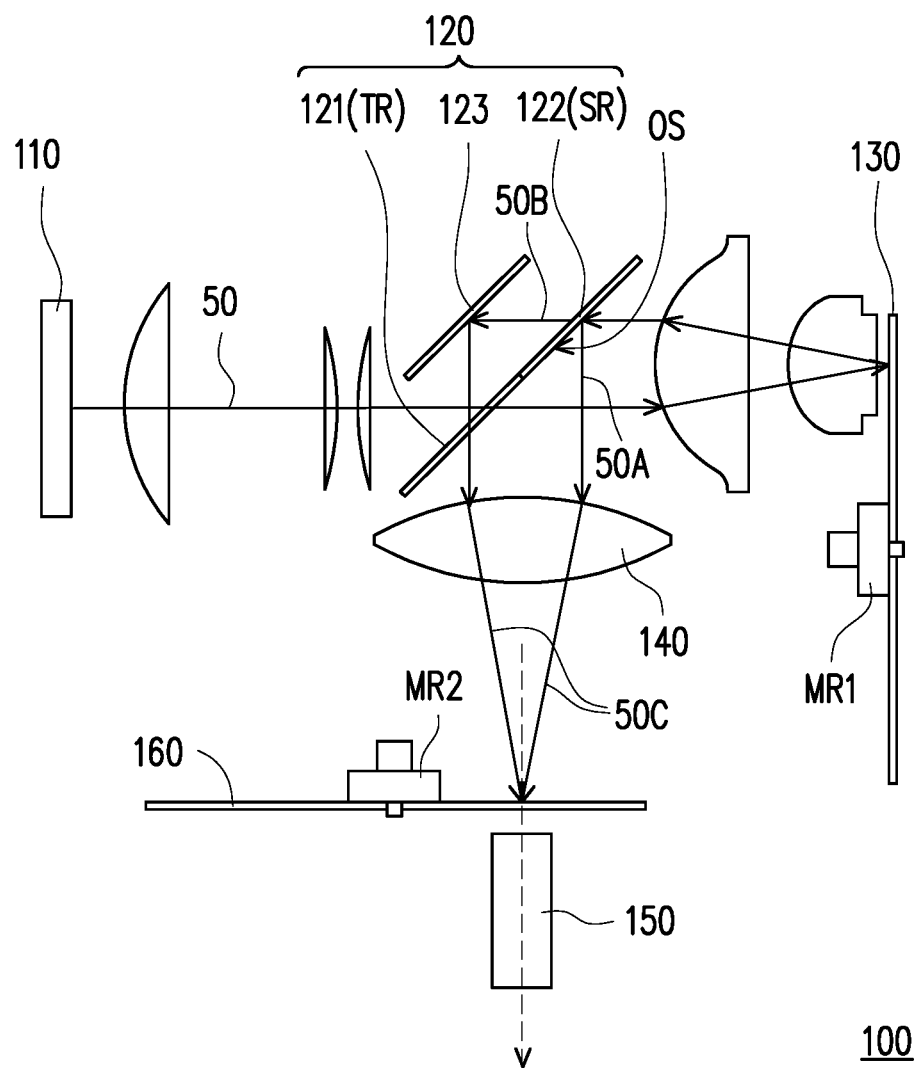
FIG. 3B is a schematic diagram of an optical path of an excitation beam passing through a light splitting module of FIG. 2A.

FIG. 1 is a structural schematic diagram of a projection apparatus according to an embodiment of the invention. FIG. 2A is a schematic diagram of a transfer region and a light splitting region of a light splitting module of FIG. 1. FIG. 2B is a front view of a wavelength conversion module of FIG. 1. FIG. 3A is a schematic diagram of an optical path of a wavelength converted beam of an illumination system of FIG. 1. FIG. 3B is a schematic diagram of an optical path of an excitation beam passing through the light splitting module of FIG. 2A. Referring to FIG. 1, in the embodiment, the projection apparatus 200 includes an illumination system 100, a light valve 210 and a projection lens 220. In the embodiment, the light valve 210 is, for example, a Digital Micro-mirror Device (DMD) or a Liquid-Crystal-On-Silicon (LCOS) panel. However, in other embodiment, the light valve 210 may also be a transmissive liquid crystal panel or other beam modulator. The number of the light valve 210 may be one or plural.

To be specific, as shown in FIG. 1, the illumination system 100 is configured to provide an illumination beam 70, and the illumination system 100 includes an excitation light source 110, a light splitting module 120, a wavelength conversion module 130, a light converging element 140 and a light homogenizing element 150. The excitation light source 110 is configured to emit an excitation beam 50. For example, in the embodiment, the excitation light source 110 is a blue laser light source, and the excitation beam 50 is a blue laser beam, i.e. a beam with a blue waveband. The excitation light source 110, for example, includes a plurality of blue laser diodes arranged in an array (not shown), though the invention is not limited thereto.

Further, as shown in FIG. 1, FIG. 2A and FIG. 2B, in the embodiment, the light splitting module 120 is located on the transmission path of the excitation beam 50, and is located between the excitation light source 110 and the wavelength conversion module 130, where the light splitting module 120 has a transfer region TR and a light splitting region SR. The excitation beam 50 emitted from the excitation light source 110 is incident to the wavelength conversion module 130 through the transfer region TR. The excitation beam 50 passing through the light splitting region SR forms a first sub-excitation beam 50A and a second sub-excitation beam 50B. To be specific, as shown in FIG. 1, in the embodiment, the light splitting module 120 includes a dichroic element 121, a light splitting element 122 and a reflection element 123 (for example, a reflection mirror). As shown in FIG. 1 and FIG. 2A, the light splitting element 122 is connected to the dichroic element 121, and the dichroic element 121 and the light splitting element 122 are coplanar. In other words, in the embodiment, surfaces of the dichroic element 121 and the light splitting element 122 facing the wavelength conversion module 130 commonly form an optical surface OS.

To be specific, as shown in FIG. 1, in the embodiment, the dichroic element 121 is disposed corresponding to the transfer region TR, and is configured to transmit the excitation beam 50 to the wavelength conversion module 130. For example, in the embodiment, the dichroic element 121 is pervious to a blue beam (a beam having a blue waveband), and provides a reflection function to other colors (for example, red, green, yellow, etc.) of beams. Namely, the dichroic element 121 is pervious to the blue laser beam 50. In this way, the laser beam 50 may penetrate through the dichroic element 121 and is incident to the wavelength conversion module 130.

Then, as shown in FIG. 1, FIG. 2B, FIG. 3A and FIG. 3B, in the embodiment, the wavelength conversion module 130 is located on the transmission path of the excitation beam 50, and has at least one wavelength conversion region WR and a reflection region RR. For example, the wavelength conversion module 130 may include a substrate, and the substrate is made of a material with high reflectivity. The wavelength conversion region WR may include a wavelength conversion layer (not shown), and is configured to convert the excitation beam 50 into at least one wavelength converted beam 60, i.e. the wavelength conversion layer is irradiated by the excitation beam 50 to form the at least one wavelength converted beam 60. On the other hand, the reflection region RR may also include a high reflectivity coating or high reflectivity mirror (not shown), and is configured to reflect the excitation beam 50. Moreover, in the embodiment, the wavelength conversion module 130 further includes a first actuator MR1 (for example, a motor) configured to drive the reflection region RR and the at least one wavelength conversion region WR of the wavelength conversion module 130 to enter an irradiation range of the excitation beam 50 at different time, i.e. the reflection region RR and the at least one wavelength conversion region WR of the wavelength conversion module 130 are cut into the transmission path of the excitation beam 50 in turns, such that the excitation beam 50 selectively pass through or is converted into the at least one wavelength converted beam 60.

For example, as shown in FIG. 2B and FIG. 3A, in the embodiment, when the at least one wavelength conversion region WR of the wavelength conversion module 130 enters the irradiation range of the excitation beam 50, the at least one wavelength conversion region WR of the wavelength conversion module 130 converts the excitation beam 50 into the at least one wavelength converted beam 60, and the at least one wavelength converted beam 60 is transmitted to the light splitting module 120 and reflected by the light splitting module 120. On the other hand, as shown in FIG. 2B and FIG. 3B, the reflection region RR of the wavelength conversion module 130 is configured to reflect the excitation beam 50, such that the excitation beam 50 is again transmitted to the light splitting module 120.

Further, as shown in FIG. 3B, in the embodiment, the light splitting element 122 is a transflective element, and is disposed corresponding to the light splitting region SR, and is configured to transform a part of the excitation beam 50 transmitted to the light splitting element 122 into a first sub-excitation beam 50A and transform another part thereof into a second sub-excitation beam 50B, and the light splitting element 122 may provide a reflection function to other colors (for example, red, green, yellow, etc.) of beams. In other words, the excitation beam 50 coming from the wavelength conversion module 130 forms the first sub-excitation beam 50A and the second sub-excitation beam 50B after passing through the light splitting region SR (i.e. the light splitting element 122) of the light splitting module 120, and the at least one wavelength converted beam 60 is reflected. As shown in FIG. 3B, in the embodiment, the first sub-excitation beam 50A is reflected to the light converging element 140 by the light splitting element 122, and the reflection element 123 of the light splitting module 120 is located on a transmission path of the second sub-excitation beam 50B, so that the second sub-excitation beam 50B is reflected by the reflection element 123 to penetrate through the dichroic element 121 and is transmitted to the light converting element 140.

As shown in FIG. 3A and FIG. 3B, in the embodiment, the light converging element 140 is located on the transmission path of the first sub-excitation beam 50A, the second sub-excitation beam 50B and the at least one wavelength converted beam 60. As shown in FIG. 3A, in the embodiment, the at least one wavelength converted beam 60 is reflected by the light splitting element 122 and the dichroic element 121, and is converged to the light homogenizing element 150 through the light converging element 140. As shown in FIG. 3B, in the embodiment, the first sub-excitation beam 50A and the second sub-excitation beam 50B form an excitation combination beam 50C through the light converging element 140, and the excitation combination beam 50C is converged to the light homogenizing element 150.

Moreover, as shown in FIG. 3A and FIG. 3B, in the embodiment, the light homogenizing element 150 is located on a transmission path of the excitation combination beam 50C and the at least one wavelength converted beam 60. In the embodiment, the light homogenizing element 150 is, for example, an integration rod, though the invention is not limited thereto. To be specific, as shown in FIG. 1, FIG. 3A and FIG. 3B, when the excitation combination beam 50C and the at least one wavelength converted beam 60 form the illumination beam 70 in a timing manner and the illumination beam 70 is transmitted to the light homogenizing element 150, the light homogenizing element 150 homogenizes the illumination beam 70 formed by the excitation combination beam 50C and the at least one wavelength converted beam 60, and transmits the illumination beam 70 to the light valve 210.

Further, in the embodiment, the illumination system 100 may adjust a weight distribution of different angles of the excitation combination beam 50C incident to the light homogenizing element 150 by controlling a transmittance of the light splitting element 122. To be specific, in the embodiment, the transmittance of the light splitting element 122 for light without polarization polarity (an average of a P-wave polarized light transmittance and S-wave polarized light transmittance) may be selectively between 10%-90%. Moreover, the transmittance of the light splitting element 122 for light with a P-polarization state is selectively between 10%-90%, or the transmittance of the light splitting element 122 for light with an S-polarization state is selectively between 10%-90%. In this way, the transmittance of the light splitting element 122 could be controlled based on a polarization characteristic of the excitation beam, and thereby the transmittance of the excitation beam 50 penetrating through the light splitting element 122 would be between 10% and 90%. Therefore, a light splitting effect of the light splitting region SR (i.e. the light splitting element 122) of the light splitting module 120 is obvious, and the excitation beam 50 may be effectively split into a plurality of beams incident to the light homogenizing element in different angles.

Moreover, the illumination system 100 may also adjust the weight distribution of different angles of the excitation combination beam 50C incident to the light homogenizing element 150 by adjusting a proportion of the transfer region TR or the light splitting region SR of the light splitting module 120 occupying on the optical surface OS. For example, in the embodiment, the proportion of the transfer region TR of the light splitting module 120 occupying on the optical surface OS is between 25% and 75%. When the proportion of the transfer region TR of the light splitting module 120 occupying on the optical surface OS is between 25% and 75%, the transfer region TR or the light splitting region SR of the light splitting module 120 occupies at least 25% of the area of the optical surface OS. Therefore, an angle of the excitation combination beam 50C incident to the light homogenizing element 150 is 0.25 times larger than an angle of the at least one wavelength converted beam 60 incident to the light homogenizing element 150, which avails adjusting uniformity of the illumination beam 70 formed by the excitation combination beam 50C and the at least one wavelength converted beam 60.

The invention is further described below with reference of FIG. 4A to FIG. 5B.

FIG. 4A to FIG. 4F are structural schematic diagrams of various light splitting modules of FIG. 1. FIG. 5A and FIG. 5B are distribution schematic diagram of a first light spot region and a second light spot region of FIG. 1. As shown in FIG. 1, FIG. 4A to FIG. 4F, in the embodiment, the reflection element 123 and the optical surface OS are disposed in parallel with each other, and a length of linking the dichroic element 121 and the light splitting element 122 on the optical surface OS is a first length L. The shortest distance between the reflection element 123 and the optical surface OS may be adjusted between ⅛ of the first length L and ⅜ of the first length L according to the proportion relationship of the transfer region TR and the light splitting region SR of the light splitting module 120, and a proportion of an area of a surface of the reflection element 123 facing the optical surface OS and the area of the optical surface OS may be correspondingly adjusted between 25% and 75%.

Figure 4A:
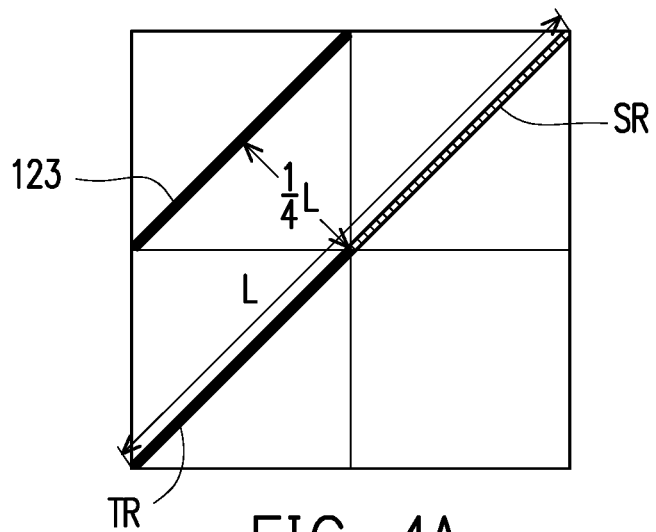
FIG. 4A to FIG. 4F are structural schematic diagrams of various light splitting modules of FIG. 1.
Figure 5A:
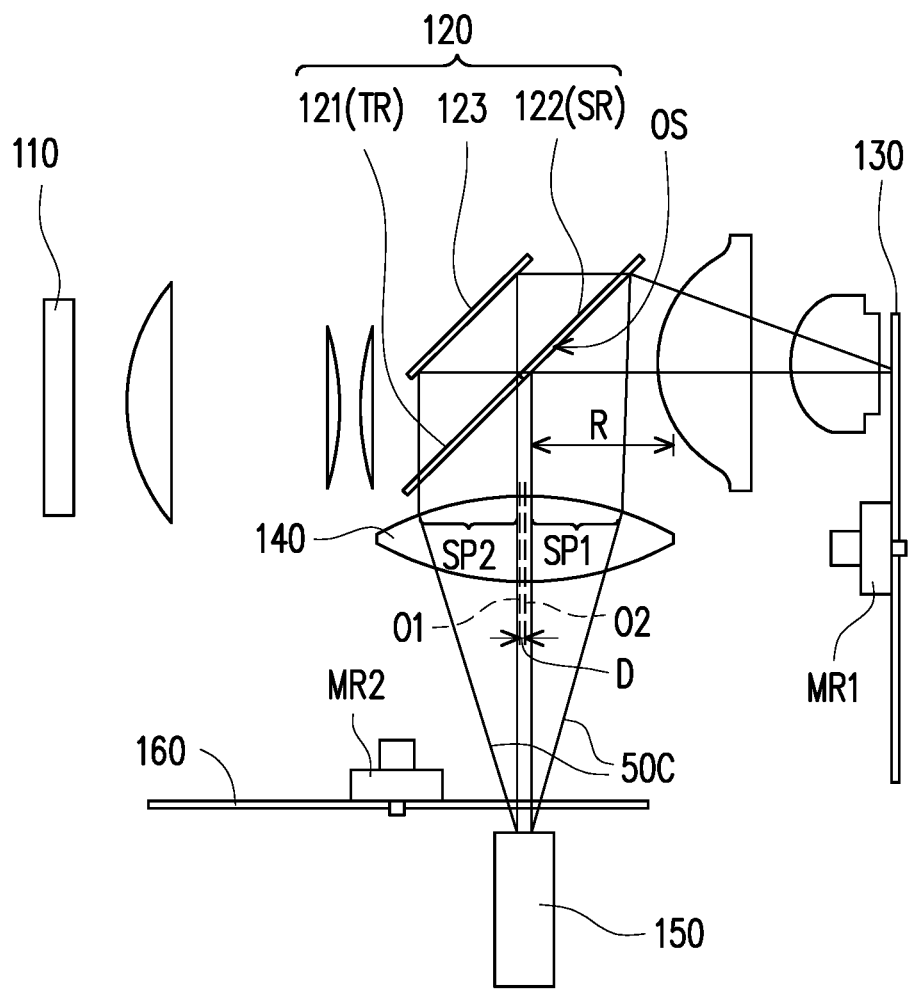
FIG. 5A is a distribution schematic diagram of a first light spot region and a second light spot region of FIG. 1.
Figure 5B:
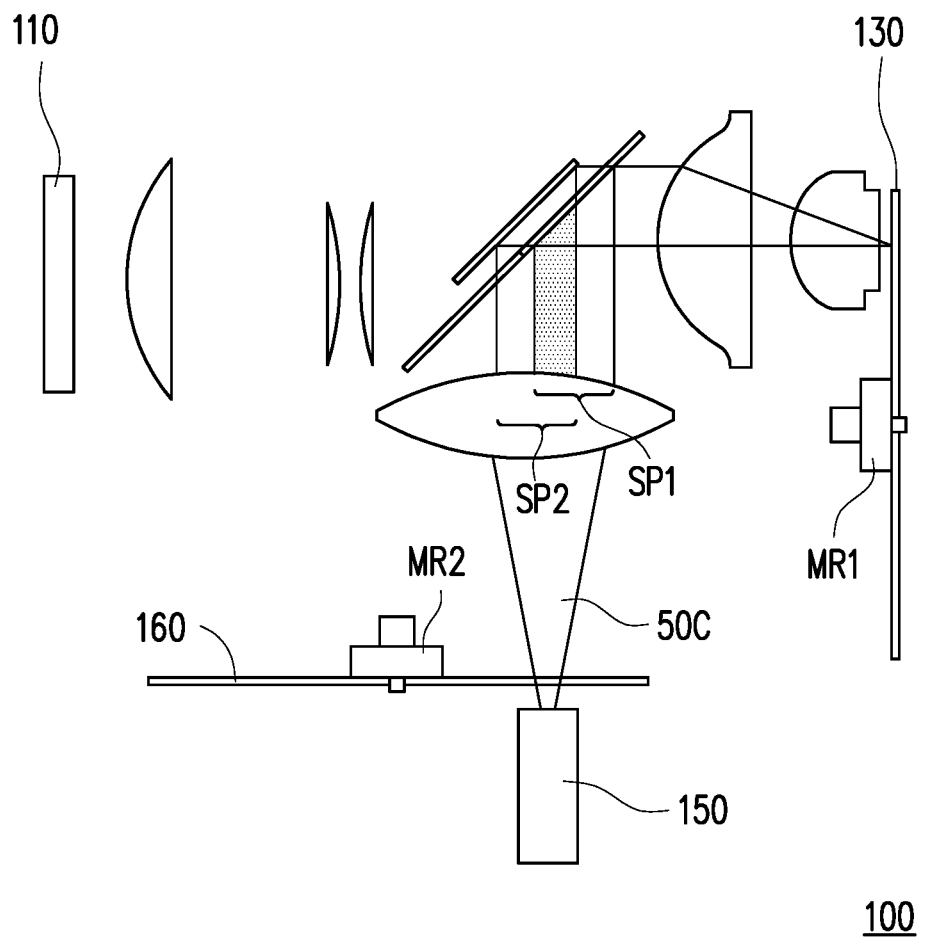
FIG. 5B is a distribution schematic diagram of another type of the first light spot region and the second light spot region of FIG. 1.

For example, as shown in FIG. 4A, when the proportion of the transfer region TR or the light splitting region SR of the light splitting module 120 on the optical surface OS is all 50%, the shortest distance between the reflection element 123 and the optical surface OS may be ¼ of the first length L, and the proportion of the area of the surface of the reflection element 123 facing the optical surface OS and the area of the optical surface OS may be correspondingly adjusted to 50%.

Figure 4B:
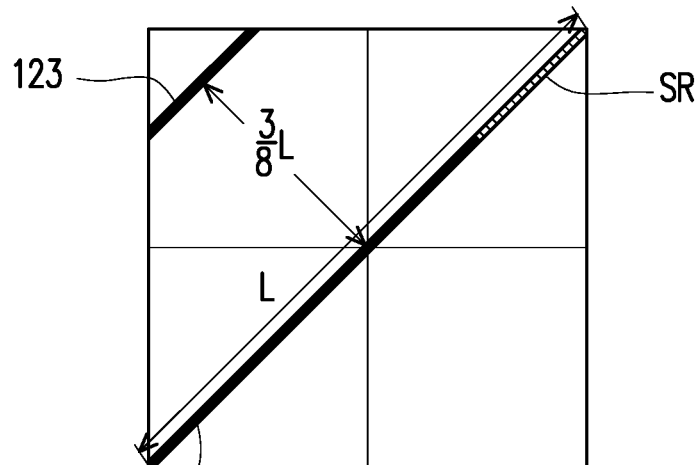
Figure 4C:
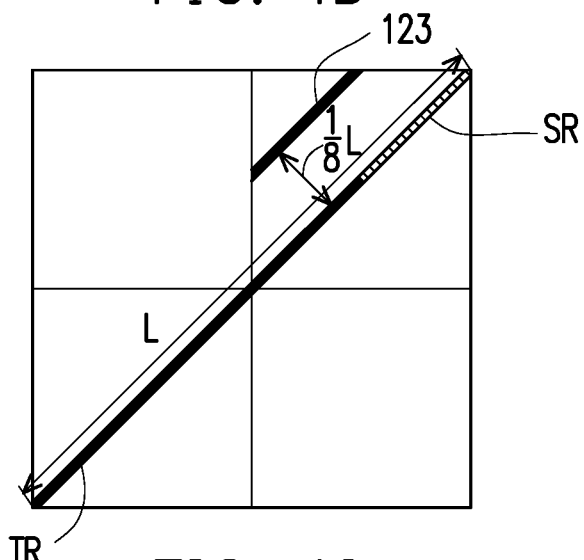

On the other hand, as shown in FIG. 4B to FIG. 4C, when the proportion of the light splitting region SR of the light splitting module 120 on the optical surface OS is 25%, the shortest distance between the reflection element 123 and the optical surface OS may be between ⅛ of the first length L and ⅜ of the first length L, and the proportion of the area of the surface of the reflection element 123 facing the optical surface OS and the area of the optical surface OS may be correspondingly adjusted to 25%.

Figure 4D:
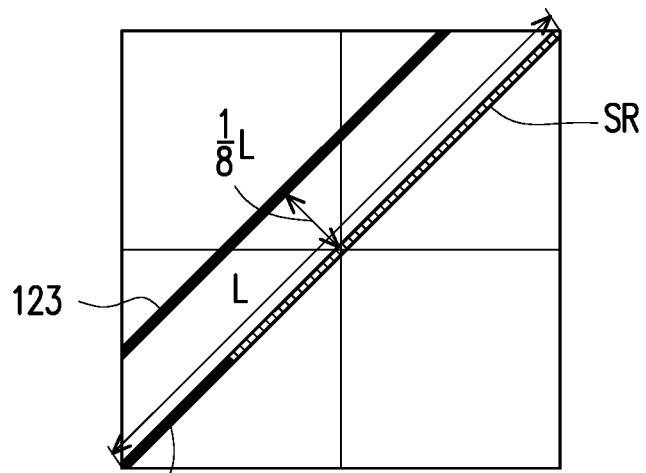
Figure 4E:
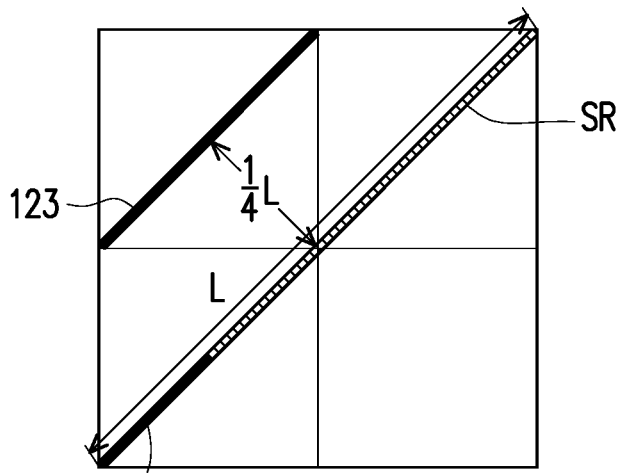
Figure 4F:
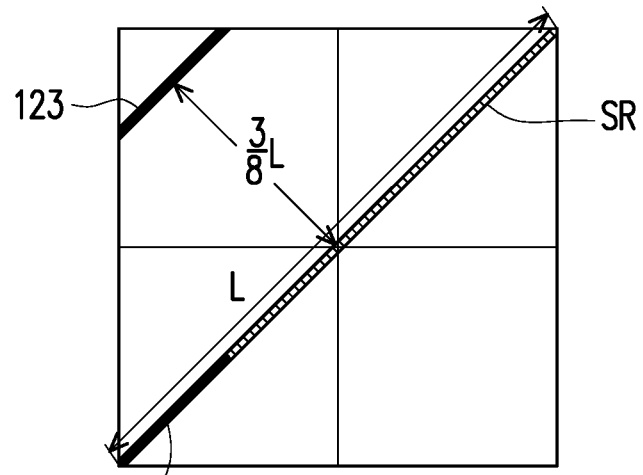

On the other hand, as shown in FIG. 4D to FIG. 4F, when the proportion of the light splitting region SR of the light splitting module 120 on the optical surface OS is 75%, the shortest distance between the reflection element 123 and the optical surface OS may be between ⅛ of the first length L and ⅜ of the first length L, and the proportion of the area of the surface of the reflection element 123 facing the optical surface OS and the area of the optical surface OS may be correspondingly adjusted between 75% and 25%.

Further, as shown in FIG. 5A to FIG. 5B, when the distance between the reflection element 123 and the optical surface OS formed by the dichroic element 121 and the light splitting element 122 is varied, magnitudes and positions of light spot regions on the light converging element 140 produced by the first sub-excitation beam 50A and the second sub-excitation beam 50B are also varied, which is adapted to control and adjust a position of an optical axis of the excitation combination beam 50C and a range of an irradiation region.

For example, as shown in FIG. 5A, the first sub-excitation beam 50A may form a first light spot region SP1 on the light converging element 140, and the second sub-excitation beam 50B may form a second light spot region SP2 on the light converging element 140, and the first light spot region SP1 and the second light spot region SP2 are not overlapped with each other. On the other hand, as shown in FIG. 5B, when the reflection element 123 is moved towards the optical surface OS, the first light spot region SP1 formed by the first sub-excitation beam 50A and the second light spot region SP2 formed by the second sub-excitation beam 50B may be partially overlapped or completely overlapped.

Therefore, the distance between the optical axis of the excitation combination beam 50C and the optical axis of the light converging element 140 may also be adjusted. For example, as shown in FIG. 5A and FIG. 5B, in the embodiment, the excitation combination beam 50C has a first optical axis O1, the light converging element 140 has a second optical axis O2, there is a spacing D between the first optical axis O1 of the excitation combination beam 50C and the second optical axis O2 of the light converging element 140, and the spacing D is smaller than a half of an outer diameter R of the light converging element 140.

Therefore, the angle of the excitation combination beam 50C incident to the light converging element 150 is 0.25 times larger than the angle of the at least one wavelength converted beam 60 incident to the light homogenizing element 150, which avails adjusting uniformity of the illumination beam 70 formed by the excitation combination beam 50C and the at least one wavelength converted beam 60.

Referring to FIG. 1, FIG. 3A and FIG. 3B, as shown in FIG. 1, FIG. 3A and FIG. 3B, in the embodiment, the projection apparatus 200 further includes a filter module 160, where the filter module 160 is located on the transmission path of the excitation combination beam 50C and the at least one wavelength converted beam 60, and has a filter region (not shown) and a transparent region (not shown). The filter module 160 further includes a second actuator MR2 configured to drive the filter region (not shown) to correspondingly enter the irradiation range of the wavelength converted beam 60 at different time, so as to respectively form red color light and green color light. On the other hand, the transparent region (not shown) may also correspondingly enter the irradiation range of the excitation combination beam 50C transmitted to the filter module 160 at different time, so as to form blue color light. Therefore, the excitation combination beam 50C and the wavelength converted beam 60 are converted into the illumination beam 70 with a plurality of different colors in timing.

It should be noted that in the embodiment, the filter module 160 is, for example, located between the light converging element 140 and the light homogenizing element 150, though the invention is not limited thereto. In another embodiment that is not shown, the light homogenizing element 150 may also be located between the light converging element 140 and the filter module 160. In this way, the excitation combination beam 50C and the at least one wavelength converted beam 60 are first homogenized by the light homogenizing element 150, and then pass through the filter module 160 to form the illumination beam 70, and the illumination beam 70 is transmitted to the light valve 210.

Then, as shown in FIG. 1, the light valve 210 is located on the transmission path of the illumination beam 70, and is configured to convert the illumination beam 70 into an image beam 80. The projection lens 220 is located on the transmission path of the image beam 80 and is configured to convert the image beam 80 into a projection beam 90, and projects the projection beam 80 onto a screen (not shown) to form an image. After the illumination beam 70 is converged on the light valve 210, the light valve 210 sequentially converts the illumination beam 70 into the image beam 80 of different colors for transmitting to the projection lens 220. Therefore, the image formed by projecting the image beam 80 converted by the light valve 210 becomes a color image.

In this way, through using the configuration of the transfer region TR and the light splitting region SR of the light splitting module 120, the projection apparatus 200 and the illumination system 100 are capable of causing that the angle of the excitation combination beam 50C incident to the light homogenizing element 150 is 0.25 times larger than the angle of the at least one wavelength converted beam 60 incident to the light homogenizing element 150, which avails adjusting uniformity of the illumination beam 70 formed by the excitation combination beam 50C and the at least one wavelength converted beam 60, such that the projected image has good image quality.

Figure 6A:
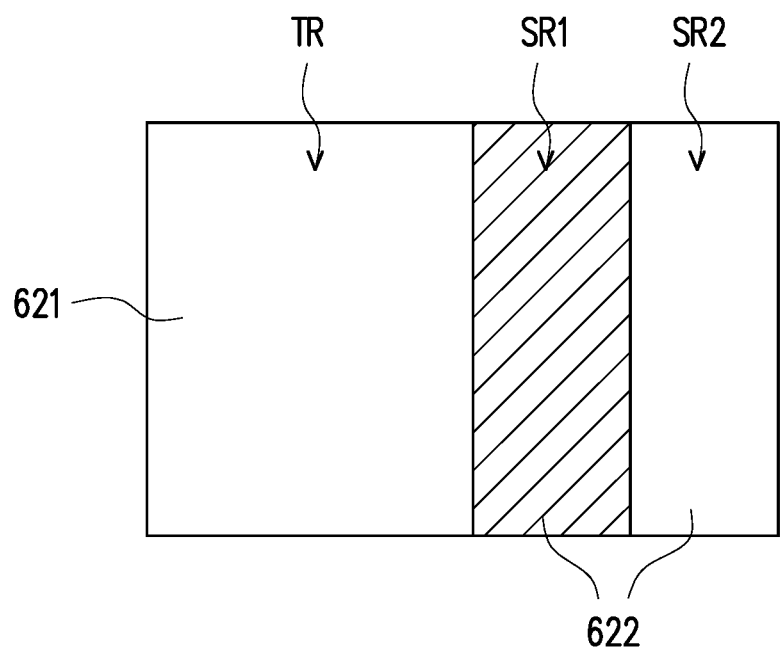
FIG. 6A is a schematic diagram of a transfer region and a light splitting region of another type of the light splitting module of FIG. 1.
Figure 6B:
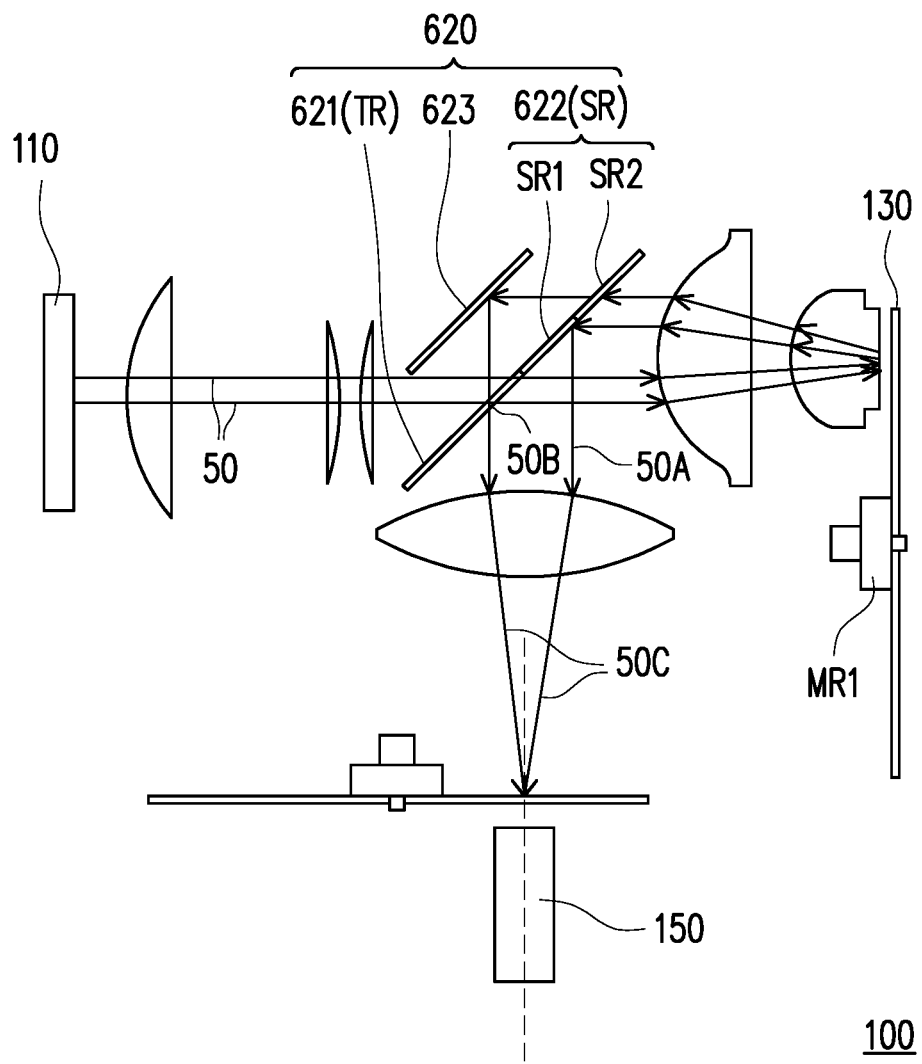
FIG. 6B is a schematic diagram of an optical path of an excitation beam passing through the light splitting module of FIG. 6A.

FIG. 6A is a schematic diagram of a transfer region and a light splitting region of another type of the light splitting module of FIG. 1. FIG. 6B is a schematic diagram of an optical path of the excitation beam passing through the light splitting module of FIG. 6A. Referring to FIG. 6A, the light splitting module 620 of the embodiment is similar to the light splitting module 120 of FIG. 1, and differences there between are as follows. In the embodiment, the light splitting element 622 of the light splitting module 620 has a first region SR1 and a second region SR2, where the first region SR1 is located between the second region SR2 and the dichroic element 621, and the first region SR1 of the light splitting element 622 is coated with a high reflectivity coating used for reflecting the excitation beam 50 transmitted from the wavelength conversion module 130 to form the first sub-excitation beam 50A, and the second region SR2 of the light splitting element 622 is coated with a high transmissive coating used for letting the excitation beam 50 transmitted from the wavelength conversion module 130 to penetrate through to form the second sub-excitation beam 50B, and the second sub-excitation beam 50B is transmitted to the reflection element 623. For example, in the embodiment, a transmittance of the excitation beam 50 penetrating through the first region SR1 of the light splitting element 622 is smaller than 5% (i.e. the reflectivity is greater than 95%), and a transmittance of the excitation beam 50 penetrating through the second region SR2 of the light splitting element 622 is greater than 95%. It should be noted that the above value ranges are only used as an example, and are not used for limiting the invention.

Therefore, when the light splitting module 620 is applied to the projection apparatus 200 and the illumination system 100 of FIG. 1, through using the configuration of the transfer region TR and the light splitting region SR, the angle of the excitation combination beam 50C incident to the light homogenizing element 150 is 0.25 times larger than the angle of the at least one wavelength converted beam 60 incident to the light homogenizing element 150, which avails adjusting uniformity of the illumination beam 70 formed by the excitation combination beam 50C and the at least one wavelength converted beam 60, such that the projected image has good image quality, and the illumination system 100 and the projection apparatus 200 may achieve the similar effects and advantages, which are not repeated.

Figure 7:
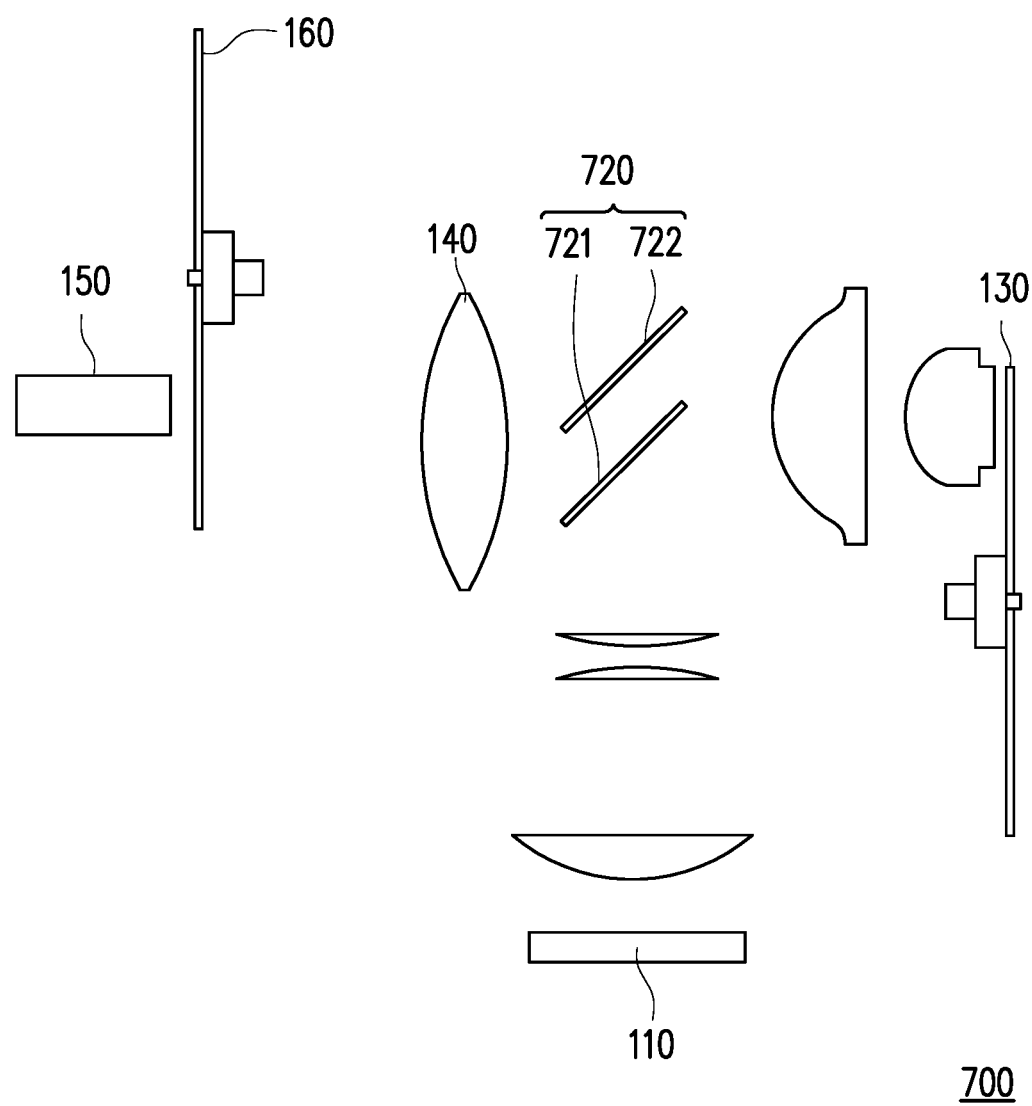
FIG. 7 is a structural schematic diagram of another illumination system according to an embodiment of the invention.
Figure 8A:
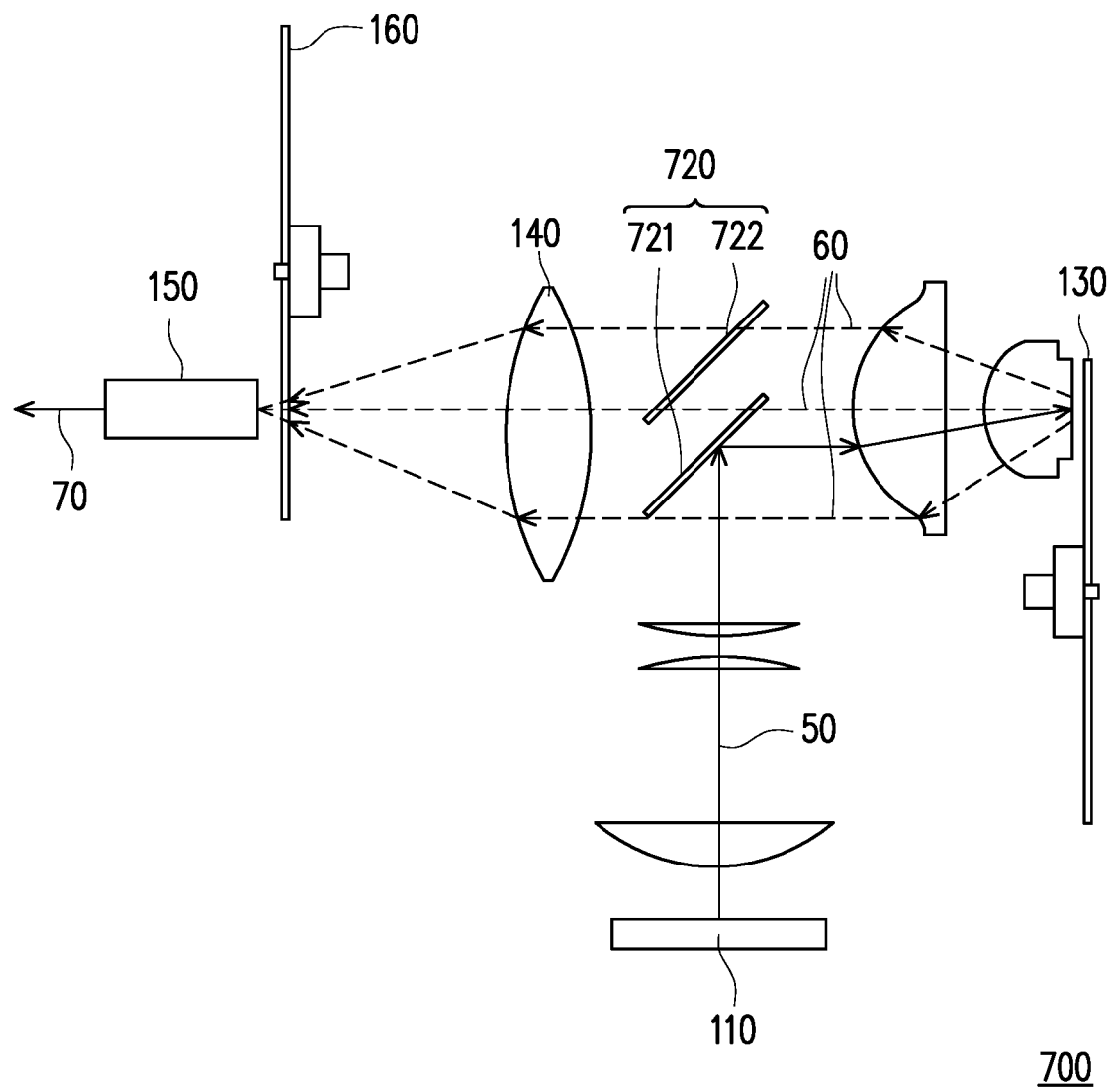
FIG. 8A is a schematic diagram of an optical path of a wavelength converted beam of the illumination system of FIG. 7.
Figure 8B:
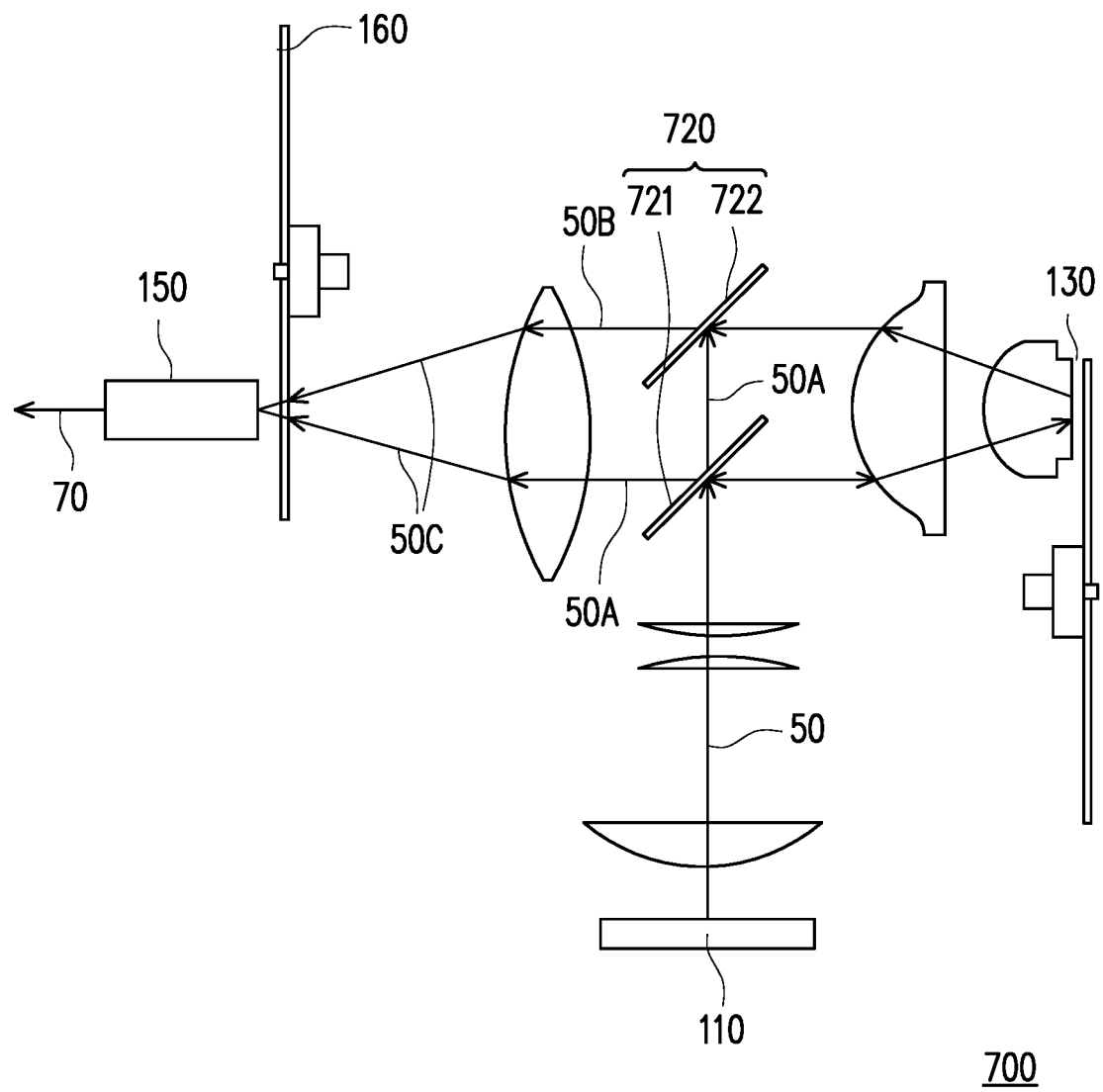
FIG. 8B is a schematic diagram of an optical path of an excitation beam of the illumination system of FIG. 7.

FIG. 7 is a structural schematic diagram of another illumination system according to an embodiment of the invention. FIG. 8A is a schematic diagram of an optical path of a wavelength converted beam of the illumination system of FIG. 7. FIG. 8B is a schematic diagram of an optical path of an excitation beam of the illumination system of FIG. 7. Referring to FIG. 7, the illumination system 700 of the embodiment is similar to the illumination system 100 of FIG. 1, and differences there between are as follows. In the embodiment, the light splitting module 720 includes a dichroic element 721 and a light splitting element 722. The dichroic element 721 corresponds to the transfer region TR, and is configured to reflect the excitation beam 50 coming from the excitation light source 110. Namely, in the embodiment, the dichroic element 721 reflects the blue beam, and allows beams of the other colors (for example, red, green, yellow, etc.) to pass through. In this way, the excitation beam 50 may also be reflected by the dichroic element 721 to enter the wavelength conversion module 130. Then, as shown in FIG. 8A, in the embodiment, the at least one wavelength converted beam 60 coming from the wavelength conversion module 130 may pass through the light splitting module 720 for being transmitted to the light converging element 140 and the light homogenizing element 150.

On the other hand, in the embodiment, the light splitting element 722 of the light splitting module 720 corresponds to the light splitting region SR, and the light splitting element 722 is a transflective element, and is configured to transform a part of the excitation beam 50 into a first sub-excitation beam 50A and transform another part thereof into a second sub-excitation beam 50B. Therefore, as shown in FIG. 8B, the excitation beam 50 coming from the reflection region RR of the wavelength conversion module 130 is split into the first sub-excitation beam 50A and the second sub-excitation beam 50B by the light splitting element 722. To be specific, as shown in FIG. 8B, in the embodiment, the first sub-excitation beam 50A is reflected to the dichroic element 721 by the light splitting element 722, and is then reflected by the dichroic element 721 for being transmitted to the light converging element 140, and the second sub-excitation beam 50B is incident to the light converging element 140 and the light homogenizing element 150.

In this way, through using the configuration of the transfer region TR (i.e. the dichroic element 721) and the light splitting region SR (i.e. the light splitting element 722), illumination system 700 is capable of causing that the angle of the excitation combination beam 50C incident to the light homogenizing element 150 is 0.25 times larger than the angle of the at least one wavelength converted beam 60 incident to the light homogenizing element 150, which avails adjusting uniformity of the illumination beam 70 formed by the excitation combination beam 50C and the at least one wavelength converted beam 60, such that the projected image has good image quality, so as to achieve the similar effects and advantages with that of the aforementioned illumination system 100, which are not repeated. Moreover, when the illumination system 700 is applied to the aforementioned projection apparatus 200, the projection apparatus 200 may also achieve the similar effects and advantages, and the projected image may have good image quality, which is not repeated.

In summary, the embodiments of the invention include at least one of following advantages or effects. In the embodiments of the invention, through using the configuration of the transfer region and the light splitting region of the light splitting module, the projection apparatus and the illumination system are capable of causing that the angle of the excitation combination beam incident to the light homogenizing element is 0.25 times larger than the angle of the at least one wavelength converted beam incident to the light homogenizing element, which avails adjusting uniformity of the illumination beam formed by the excitation combination beam and the at least one wavelength converted beam, such that a projected image has good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, adapted to provide an illumination beam, and comprising:
    an excitation light source, configured to emit an excitation beam;
    a wavelength conversion module, located on a transmission path of the excitation beam, and having at least one wavelength conversion region and a reflection region;
    a light splitting module, located on the transmission path of the excitation beam and located between the excitation light source and the wavelength conversion module, wherein the light splitting module has a transfer region and a light splitting region, and the excitation beam is incident to the wavelength conversion module through the transfer region, wherein when the at least one wavelength conversion region of the wavelength conversion module is cut into the transmission path of the excitation beam, the excitation beam is converted into at least one wavelength converted beam by the at least one wavelength conversion region of the wavelength conversion module, and when the reflection region of the wavelength conversion module is cut into the transmission path of the excitation beam, the excitation beam is reflected by the reflection region of the wavelength conversion module, and the excitation beam coming from the reflection region of the wavelength conversion module is split into a first sub-excitation beam and a second sub-excitation beam by the light splitting region of the light splitting module, wherein the first sub-excitation beam and the second sub-excitation beam form an excitation combination beam; and
    a light homogenizing element, located on a transmission path of the excitation combination beam and the at least one wavelength converted beam, and configured to uniform the excitation combination beam and the at least one wavelength converted beam, wherein an angle of the excitation combination beam incident to the light homogenizing element is larger than 0.25 times of an angle of the at least one wavelength converted beam incident to the light homogenizing element.

2. The illumination system as claimed in claim 1, wherein the light splitting module comprises:
    a dichroic element, corresponding to the transfer region;
    a light splitting element, connected to the dichroic element, and corresponding to the light splitting region, wherein the first sub-excitation beam is reflected to the light homogenizing element by the light spitting element; and
    a reflection element, located on a transmission path of the second sub-excitation beam, wherein the second sub-excitation beam is reflected to the light homogenizing element by the reflection element.

3. The illumination system as claimed in claim 2, wherein the light splitting element is a transflective element, and is configured to transform a part of the excitation beam into the first sub-excitation beam and another part thereof into the second sub-excitation beam.

4. The illumination system as claimed in claim 2, wherein the light splitting element has a first region and a second region, wherein the first region is located between the second region and the dichroic element, and the first region of the light splitting element is coated with a high reflectivity coating used for reflecting the excitation beam to form the first sub-excitation beam, and the second region of the light splitting element is coated with a high transmissive coating used for letting the excitation beam to penetrate through to form the second sub-excitation beam.

5. The illumination system as claimed in claim 2, wherein a transmittance for the excitation beam penetrating through the light splitting element is between 10% and 90%.

6. The illumination system as claimed in claim 2, wherein the dichroic element and the light splitting element are coplanar, surfaces of the dichroic element and the light splitting element facing the wavelength conversion module commonly form an optical surface, and a proportion of the transfer region to the optical surface is between 25% and 75%.

7. The illumination system as claimed in claim 6, wherein the reflection element and the optical surface are parallel with each other, and a length of linking the dichroic element and the light splitting element on the optical surface is a first length, and the shortest distance between the reflection element and the optical surface is between ⅛ of the first length and ⅜ of the first length.

8. The illumination system as claimed in claim 7, wherein a proportion of an area of a surface of the reflection element facing the optical surface to an area of the optical surface is between 25% and 75%.

9. The illumination system as claimed in claim 1, further comprising:
    a light converging element, located on a transmission path of the first sub-excitation beam, the second sub-excitation beam and the at least one wavelength converted beam, wherein the first sub-excitation beam and the second sub-excitation beam are converged into the excitation combination beam by the light converging element.

10. The illumination system as claimed in claim 9, wherein the excitation combination beam has a first optical axis, the light converging element has a second optical axis, there is a spacing between the first optical axis of the excitation combination beam and the second optical axis of the light converging element, and the spacing is smaller than a half of an outer diameter of the light converging element.

11. The illumination system as claimed in claim 9, wherein the first sub-excitation beam forms a first light spot region on the light converging element, the second sub-excitation beam forms a second light spot region on the light converging element, and the first light spot region and the second light spot region are partially overlapped or completely overlapped.

12. The illumination system as claimed in claim 9, wherein the first sub-excitation beam forms a first light spot region on the light converging element, the second sub-excitation beam forms a second light spot region on the light converging element, and the first light spot region and the second light spot region are not overlapped with each other.

13. The illumination system as claimed in claim 1, wherein the light splitting module comprises:
    a dichroic element, corresponding to the transfer region, and configured to reflect the excitation beam; and
    a light splitting element, corresponding to the light splitting region, and configured to transform a part of the excitation beam into the first sub-excitation beam and another part thereof into the second sub-excitation beam, wherein the first sub-excitation beam is reflected to dichroic element by the light spitting element, and is transmitted to the light homogenizing element through the dichroic element, and the second sub-excitation beam is incident to the light homogenizing element.

14. A projection apparatus, comprising:
    an illumination system, adapted to provide an illumination beam, and comprising:
        an excitation light source, configured to emit an excitation beam;
        a wavelength conversion module, located on a transmission path of the excitation beam, and having at least one wavelength conversion region and a reflection region;
        a light splitting module, located on the transmission path of the excitation beam and located between the excitation light source and the wavelength conversion module, wherein the light splitting module has a transfer region and a light splitting region, and the excitation beam is incident to the wavelength conversion module through the transfer region, wherein when the at least one wavelength conversion region of the wavelength conversion module is cut into the transmission path of the excitation beam, the excitation beam is converted into at least one wavelength converted beam by the at least one wavelength conversion region of the wavelength conversion module, and when the reflection region of the wavelength conversion module is cut into the transmission path of the excitation beam, the excitation beam is reflected by the reflection region of the wavelength conversion module, and the excitation beam coming from the reflection region of the wavelength conversion module is split into a first sub-excitation beam and a second sub-excitation beam by the light splitting region of the light splitting module, wherein the first sub-excitation beam and the second sub-excitation beam form an excitation combination beam; and
        a light homogenizing element, located on a transmission path of the excitation combination beam and the at least one wavelength converted beam, and configured to uniform the excitation combination beam and the at least one wavelength converted beam, wherein an angle of the excitation combination beam incident to the light homogenizing element is larger than 0.25 times of an angle of the at least one wavelength converted beam incident to the light homogenizing element;
    a light valve, located on a transmission path of the illumination beam, and configured to convert the illumination beam into an image beam;
    a projection lens, located on a transmission path of the image beam, and configured to convert the image beam into a projection beam.

15. The projection apparatus as claimed in claim 14, wherein the light splitting module comprises:
    a dichroic element, corresponding to the transfer region;
    a light splitting element, connected to the dichroic element, and corresponding to the light splitting region, wherein the first sub-excitation beam is reflected to the light homogenizing element by the light spitting element; and
    a reflection element, located on a transmission path of the second sub-excitation beam, wherein the second sub-excitation beam is reflected to the light homogenizing element by the reflection element.

16. The projection apparatus as claimed in claim 15, wherein the light splitting element is a transflective element, and is configured to transform a part of the excitation beam into the first sub-excitation beam and another part thereof into the second sub-excitation beam.

17. The projection apparatus as claimed in claim 15, wherein the light splitting element has a first region and a second region, wherein the first region is located between the second region and the dichroic element, and the first region of the light splitting element is coated with a high reflectivity coating used for reflecting the excitation beam to form the first sub-excitation beam, and the second region of the light splitting element is coated with a high transmissive coating used for letting the excitation beam to penetrate through to form the second sub-excitation beam.

18. The projection apparatus as claimed in claim 15, wherein a transmittance for the excitation beam penetrating through the light splitting element is between 10% and 90%.

19. The projection apparatus as claimed in claim 15, wherein the dichroic element and the light splitting element are coplanar, surfaces of the dichroic element and the light splitting element facing the wavelength conversion module commonly form an optical surface, and a proportion of the transfer region to the optical surface is between 25% and 75%.

20. The projection apparatus as claimed in claim 19, wherein the reflection element and the optical surface are parallel with each other, and a length of linking the dichroic element and the light splitting element on the optical surface is a first length, and the shortest distance between the reflection element and the optical surface is between 1/8 of the first length and 3/8 of the first length.

21. The projection apparatus as claimed in claim 20, wherein a proportion of an area of a surface of the reflection element facing the optical surface to an area of the optical surface is between 25% and 75%.

22. The projection apparatus as claimed in claim 14, further comprising:
a light converging element, located on a transmission path of the first sub-excitation beam, the second sub-excitation beam and the at least one wavelength converted beam, wherein the first sub-excitation beam and the second sub-excitation beam are converged into the excitation combination beam by the light converging element.

23. The projection apparatus as claimed in claim 22, wherein the excitation combination beam has a first optical axis, the light converging element has a second optical axis, there is a spacing between the first optical axis of the excitation combination beam and the second optical axis of the light converging element, and the spacing is smaller than a half of an outer diameter of the light converging element.

24. The projection apparatus as claimed in claim 22, wherein the first sub-excitation beam forms a first light spot region on the light converging element, the second sub-excitation beam forms a second light spot region on the light converging element, and the first light spot region and the second light spot region are partially overlapped or completely overlapped.

25. The projection apparatus as claimed in claim 22, wherein the first sub-excitation beam forms a first light spot region on the light converging element, the second sub-excitation beam forms a second light spot region on the light converging element, and the first light spot region and the second light spot region are not overlapped with each other.

26. The projection apparatus as claimed in claim 14, wherein the light splitting module comprises:
a dichroic element, corresponding to the transfer region, and configured to reflect the excitation beam; and
a light splitting element, corresponding to the light splitting region, and configured to transform a part of the excitation beam into the first sub-excitation beam and another part thereof into the second sub-excitation beam, wherein the first sub-excitation beam is reflected to dichroic element by the light spitting element, and is transmitted to the light homogenizing element through the dichroic element, and the second sub-excitation beam is incident to the light homogenizing element.

* * * * *